United States Patent [19]

De Jong

[11] 4,438,642

[45] Mar. 27, 1984

[54] ATTACHMENT DEVICE

[75] Inventor: Hendrik J. De Jong, Groenlo, Netherlands

[73] Assignee: N.V. Nederlandsche Apparatenfabriek Nedap, De Groenlo, Netherlands

[21] Appl. No.: 331,791

[22] Filed: Dec. 17, 1981

[30] Foreign Application Priority Data

Dec. 18, 1980 [NL] Netherlands .......................... 8006896

[51] Int. Cl.[3] .............................................. F16B 41/00

[52] U.S. Cl. ................................ 70/232; 70/DIG. 57

[58] Field of Search ...................... 70/58, 57, 229, 230, 70/232, DIG. 57

[56] References Cited

U.S. PATENT DOCUMENTS 3,625,031 12/1971 Alley ........................................ 70/58

3,765,197 10/1973 Foote ........................................ 70/58

4,065,946 1/1978 Loynes ........................................ 70/58

4,094,173 6/1978 Brown ........................................ 70/237

FOREIGN PATENT DOCUMENTS 270354 1/1930 Italy ........................................ 70/232

959271 5/1964 United Kingdom .

*Primary Examiner*—Robert L. Wolfe

*Attorney, Agent, or Firm*—Fleit, Jacobson, Cohn & Price

[57] ABSTRACT

Attachment device by means of which a safety device can be attached to an article, comprising a hollow sleeve accommodating a screw member through operation of which the attachment device can be attached to an article to be protected, while said sleeve extends beyond the article-averted end of the screw member and being provided with a transverse bore hole provided in the corresponding end, said transverse bore hole being adapted to receive a lock shackle or the like which renders the screw member inaccessible to tools.

5 Claims, 4 Drawing Figures

ATTACHMENT DEVICE

The invention relates to an attachment device by means of which a safety device can be attached to an article.

It is known to protect goods, e.g. in shops, by means of a safety device, such as a padlock and/or a detection tag which is adapted to cooperate with an electromagnetic detection system, against illicit removal. To this effect however, the article to be protected should be provided with a through-feed opening for a lock shackle or pin or the like of the safety device.

Many articles that are eligible for protection however do not have such a through-feed opening. A major group of such articles is formed by photographic and film cameras, lenses, flash apparatuses etc. Consequently, there is a need of an attachment device enabling to couple also articles that are not provided with a through-feed opening with a safety device. It is the object of the invention to satisfy this need.

To this effect according to the invention an attachment device of the above-described type is characterized by a hollow sleeve accommodating a screw member through operation of which the attachment device can be attached to an article to be protected, while the sleeve extends beyond the article-averted end of the screw member and is provided with a transverse bore hole provided in the corresponding end, said hole being adapted to receive a lock shackle or the like, which renders the screw member inaccessible to tools.

Some embodiments of the invention will now be described, by way of example, with reference to the accompanying drawing, wherein FIG. 1 is a cross-section of a first embodiment of an attachment device according to the invention;

Figure 1:
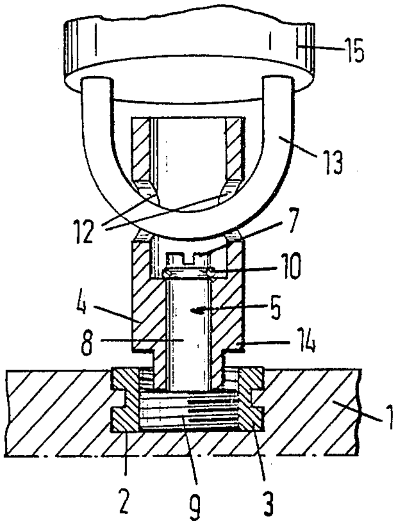

FIG. 1 shows an attachment device according to the invention which is suitable for application in photographic and film cameras and the like photographic articles. These articles are mostly provided with a blind screwed hole for attachment on a stand or for attaching auxiliary apparatus. According to the invention such a screwed hole is used in a manner to be described for applying the attachment device, which itself can again be coupled to a safety device. It is advantageous that the thread disposed in such a blind screwed hole is internationally standardized.

In FIG. 1 the article to be protected, of which only a small portion is shown, is indicated by 1. In the article there is provided a recess 2 accommodating an internally threaded sleeve 3. This is the screwed sleeve normally present for attachment to a stand or the like, which therefore does not form part of the attachment device. The attachment device proper comprises a sleeve 4 accommodating a specially formed screw member 5. The screw member 5 comprises a head 7, a shank 8 and a threaded portion 9 having a larger diameter than the shank. The head and the shank extend into the sleeve 4, while the threaded portion is present outside the sleeve 4 and abuts against an end face of the sleeve. The screw member is secured against axial displacement relative to the sleeve 4 but is adapted though for rotation in the sleeve. The securing in the embodiment shown consists of a spring washer 10 which falls in an annular groove disposed just underneath the head 7. In this manner it is possible to apply the spring washer after the screw member has been positioned in the sleeve 4.

In the sleeve 4 above the head 7 of the mounted screw member there is provided a transverse bore hole 12 through which can be inserted for instance a shackle of a padlock or other protection device. In the figure such a bracket is indicated by 13.

When the shackle has been applied, the screw head 7 is inaccessible to a screwdriver, pincer or the like.

The sleeve 4 is adapted for rotation in mounted condition about the screw member 5 so that the screw member cannot be removed by means of the sleeve 4 from the screwed sleeve 3.

Furthermore, the length of the threaded portion 9 is smaller than the length of the screwed sleeve 3 and the end of the sleeve 4 adjacent the threaded portion has such a diameter that this end fits in the screwed sleeve 3. The threaded portion 9 is thereby inaccessible to tools as well.

In the embodiment shown in FIG. 1, the sleeve 4 is moreover provided with a projecting shoulder 14 covering the opening of the screwed sleeve 3.

After removal of the lock shackle, the attachment device can be simply applied or removed by tightening or loosening the screw member by means of a tool fitting on the head 7 of the screw member and inserted in the sleeve 4. However, this is impossible as long as the lock shackle 13 extends through the transverse bore hole 12.

Figure 2:
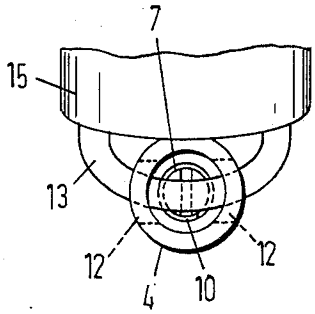
FIG. 2 is a top view of the device shown in FIG. 1.

This is shown for clearness' sake in top view in FIG. 2. The shackle 13 here forms part of a lock 15.

Figure 3:
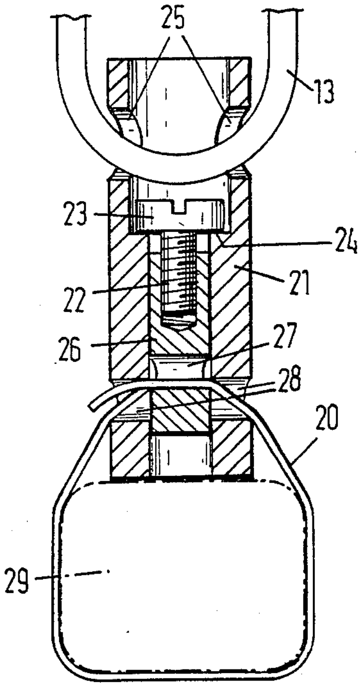
FIG. 3 is a cross-section of a second embodiment of a device according to the invention.
Figure 4:
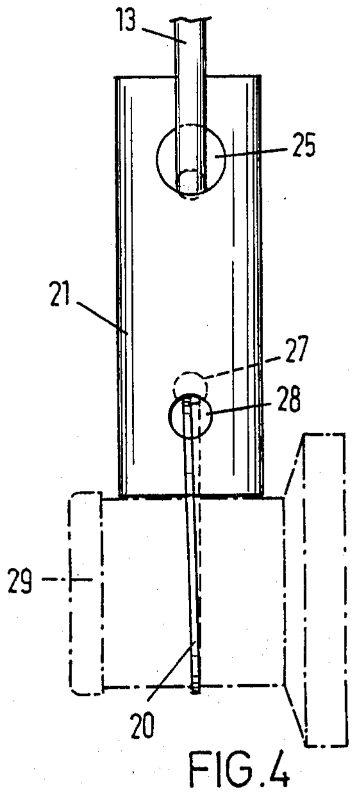
FIG. 4 is a side view of the device of FIG. 3.

FIGS. 3 and 4 show a different attachment device according to the invention, destined for the articles to be protected that do not have a screwed sleeve but about which can be clamped a hardened steel band 20 for wire or the like which cannot be cut with simple means. Also this device uses a sleeve 21 wherein is provided a screw member 22. The screw member 22 has an enlarged head 23 resting on an internal shoulder 24 of the sleeve. Above the head 23 there is provided a transverse bore hole 25 in the sleeve wherein again a shackle 13 can be inserted in order to make the head inaccessible.

Furthermore, the threaded portion is adapted for coaction with an internally threaded sliding piece 26 adapted for up and down movement in the sleeve 21 by turning the head 23 with a suitable tool. If desired, the bore hole of the sleeve and the sliding piece can be unround in order to prevent rotation of the sliding piece.

Both the sliding piece 26 and the sleeve 21 are provided with a transverse bore hole 27, respectively 28.

For the purpose of applying the attachment means on e.g. a lens 29, the head 24 is turned, after removal of shackle 13, in such a way that the transverse bore hole 27 of the sliding piece is in registry with the corresponding transverse bore hole 28 of the sleeve 21. Subsequently, the ends of the wire or band 20 are inserted through the bore holes 27 and 28 after having been applied about the article 29 to be protected. Subsequently, the sliding piece is moved upwards by means of the screw member so that the band or wire is clamped. After this, the shackle 13 is inserted through the bore hole 25 so that the head 24 becomes inaccessible. The wire or band now is tightly applied about the article 29, while the lower end of the sleeve 21 rests against the article.

It is observed that various modifications of the above-described embodiments are possible. For instance, the heads of the depicted screw members 5, resp. 22 may have various obvious shapes. It is also possible in the example of FIGS. 3 and 4 that the wire or band is clamped by moving the sliding piece precisely in the direction of the article. These and other modifications are deemed to fall under the scope of the invention.

I claim:

1. Attachment device by means of which a safety device can be attached to an article, characterized by a hollow sleeve accommodating a screw member the operation of which enables to attach the attachment device to an article to be protected, said sleeve extending beyond the article-averted end of the screw member and being provided with a transverse bore hole provided in the corresponding end, which transverse bore hole is adapted to receive a lock shackle means which renders the screw member inaccessible to tools and said screw member has a screw head which rests against an internal shoulder of the sleeve by means of a spring washer, and that the head-averted end of the screw member is provided with a threaded portion extending beyond the sleeve and having a larger core diameter than the outer diameter of the corresponding end of the sleeve, which threaded portion is adapted to be screwed in a screwed hole of an article to be protected.

2. Attachment device by means of which a safety device can be attached to an article, characterized by a hollow sleeve accommodating a screw member the operation of which enables to attach the attachment device to an article to be protected, said sleeve extending beyond the article-averted end of the screw member and being provided with a transverse bore hole provided in the corresponding end, which transverse bore hole is adapted to receive a lock shackle means which renders the screw member inaccessible to tools and said screw member has a screw head which rests against an internal shoulder of the sleeve and that the threaded portion extends in a threaded bore hole of a sliding piece positioned in the sleeve, which sliding piece is furthermore provided with a transverse bore hole adapted to be brought in registry with an additional transverse bore hole in the sleeve, so that in this position the ends of a wire means can be inserted through the bore holes and can be secured by displacing the sliding piece in the sleeve by means of the screw member.

3. Attachment device according to claim 1, characterized in that the length of the threaded portion is smaller than the depth of the screwed hole.

4. Attachment device according to claim 3, characterized in that the sleeve has a projecting shoulder at some distance from the end disposed adjacent the threaded potion, which shoulder covers the screwed hole.

5. Attachment device according to claim 2, characterized in that the sliding piece and the bore hole of the sleeve in situ of the trajectory of the sliding piece have such a shape that rotation of the sliding piece is prevented.

* * * * *